W. TURNBULL.
FLUSHER FOR WATER CLOSETS AND THE LIKE.
APPLICATION FILED AUG. 5, 1908.
960,602.
Patented June 7, 1910.
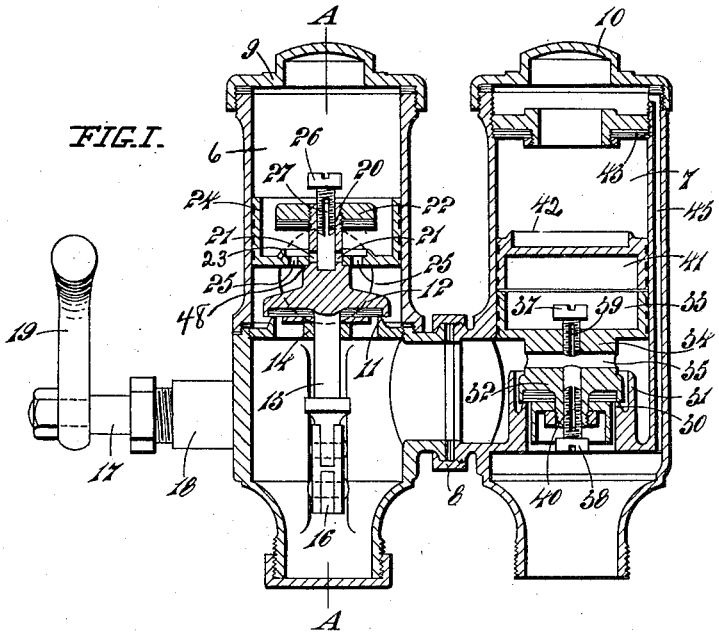
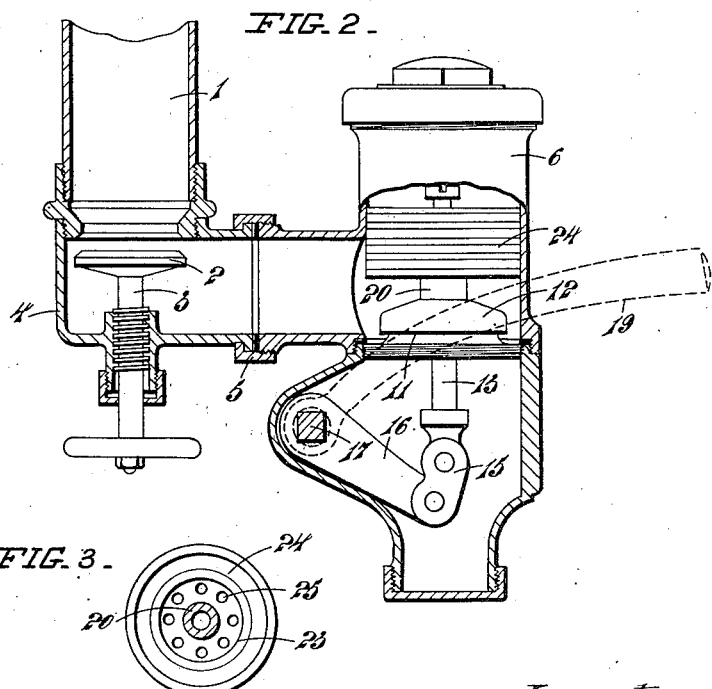
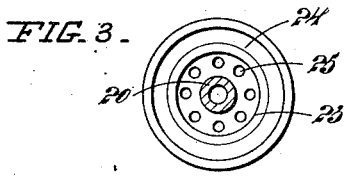
Witnesses.
Inventor:
William Turnbull.
by Baldwin & Rayward
Attorneys.

UNITED STATES PATENT OFFICE.

WILLIAM TURNBULL, OF WELLINGTON, NEW ZEALAND.

FLUSHER FOR WATER-CLOSETS AND THE LIKE.

960,602.  Specification of Letters Patent.  Patented June 7, 1910.

Application filed August 5, 1908. Serial No. 447,179.

*To all whom it may concern:*

Be it known that I, WILLIAM TURNBULL, a subject of His Majesty the King of Great Britain and Ireland, residing at 256 Lambton Quay, Wellington, in the provincial district of Wellington, in the Dominion of New Zealand, have invented certain new and useful Improvements in an Improved Flusher for Water-Closets and the Like, of which the following is a specification.

This invention relates to apparatus used in systems for flushing water closets and the like, and by which waste of water is prevented.

By my invention a predetermined amount of water passes to the pan of the closet each time the apparatus is operated and this amount cannot be exceeded by the operator until after a predetermined lapse of time which can be readily varied.

I attain these objects of my invention by the mechanism illustrated in the accompanying drawing, in which:—

Figure 1, is a sectional elevation, Fig. 2, a sectional elevation on line A—A Fig. 1. Fig. 3, a plan of a valve.

The down pipe 1 is connected to any suitable storage of water such as a tank placed in a high part of a building to the water closets of which the flusher is fitted. A stop valve 2 having a screwed spindle 3 is adapted to close the pipe 1 and cut off the water when it is desired to examine the flusher, or to regulate the amount of water admitted to the flusher. The pipe 1 screws into an elbow 4 to which the flusher is connected by a union nut 5.

The flusher comprises two cylindrical chambers 6 and 7 connected together by a union nut 8, closed at the top by caps 9 and 10, and fitted with valves and mechanism, which will now be described in detail.

The chamber 6 has a valve seating 11 located below the level of the elbow 4 and is fitted with a leather faced valve 12. The stem 13 of this valve descends through a guide bar 14 into the lower part of the chamber, where it is connected by a link 15 to an arm 16 fixed to a spindle 17 passing through a stuffing box 18 to the outside of the chamber. An operating handle 19 is fixed to the spindle, so that when the said handle is raised the valve 12 is lifted off its seat.

The top of the valve 12 is provided with a hollow stem 20 having lateral holes 21 communicating with the interior of the said stem. A leather faced valve 22 fixed to the top of the stem 20 fits upon a seat 23 formed upon a piston 24 having holes 25 within the circumference of the valve seat 23. The stem 20 is fitted with a screw 26 having a sawcut 27.

The chamber 7 has a valve seat 30 surrounded by a circular wall 31, fitted with a leather faced valve 32, and made integral with a piston 33 by a neck 34 having a lateral hole 35. Holes communicating with the top of the piston 35 and the bottom of the valve 32 are fitted respectively with screws 37 and 38 having sawcuts 39 and 40. A second piston 41 superposed upon the piston 33 has a valve seat 42 adapted to close upon a leather valve seat 43 fixed near the top of this chamber 7.

A communication between the top of the chamber above the valve seat 43 and below the valve seat 30 is established by a passage 45.

The operation of the flusher is as follows:—The cock 2 having been opened, water enters the chamber 6, fills the space between the valve 12 and the piston 24, and passes through the holes 25 until the upper part of the chamber is filled. If an operator now raises the handle 19, the valve 12 is lifted off its seat, and the valve 22 and piston 24 raised, water passing from above to below the piston through the holes 25. Upon the operator releasing the handle the valve 22 closes upon its seat 23, preventing water passing through the holes 25, but allowing water to pass through the holes 21 and the sawcut 27. The handle will then slowly descend until the valve 12 settles upon its seat, and the piston 24 will then fall down upon its shoulder 48.

The raising of the valve 12 admits water to the chamber 7, and the water forces the pistons 33 and 41 to the top of the chamber 7, lifting the valve 32 off its seat, air confined in the upper part of the said chamber escaping through the passage 45. Water for flushing passes through the lower part of the chamber, which is connected in any ordinary manner as for example by a pipe to the usual pan, not shown on the drawing. The piston 33 descends as the water passes from beneath the piston through the hole 35 and the sawcut 39 into the space between the pistons 33 and 41, and until the said valve rests upon its seat 30, the descent being checked by the water confined within the circular wall 31, and the piston 41 preventing water passing down the passage 45. The flow of flushing water then ceases, and until it is released the water trapped between the pistons 33 and 41 prevents the valve 33 from being again raised. The duration of time of withdrawal of this water is regulated by the screw 38 and its sawcut 40 to allow the confined water to pass at any desired speed. The water from the lower part of the chambers passes slowly away through the sawcut 40 in the screw 38 and is followed by the water confined between the two pistons 33 and 41. Upon the withdrawal of the water the piston 41 descends, leaving the space above filled with air ready to be expelled through the passage 45 when the handle 19 is again operated.

If an operator attempts to effect a continuous flow of water by holding up the handle 19, his object will be defeated, as the valve 32 will nevertheless descend upon its seat and stop the flow. Similarly the flow will not be made to continue by raising the handle 19 several times in succession. The flow of water through the flusher does not lift the piston 33 until the piston 41 has descended from the seat 43.

What I do claim and desire to secure by Letters Patent of the United States is:—

In a flusher of the class described a first chamber, a second chamber communicating with the first chamber, a valve and valve seat within the second chamber, a piston above the valve and fitting the second chamber, a neck having a lateral hole and connecting the valve and piston, screws having sawcuts and screwed into holes passing through the piston and valve and communicating with the lateral hole in the neck, a second piston fitting the second chamber and a valve seat at the top of the second chamber, there being a passage for air from the top of the second chamber to the bottom thereof, as set forth.

In testimony whereof I have signed my name to this specification in the presence of two witnesses.

WILLIAM TURNBULL.

Witnesses:
ERNEST SMITH BALDWIN,
HEWNETT RAYWARD.